(12) United States Patent  (10) Patent No.: US 7,764,576 B2
Asai  (45) Date of Patent: Jul. 27, 2010

(54) OPTICAL INFORMATION RECORDING AND REPRODUCING APPARATUS

(75) Inventor: Yoshikazu Asai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 351 days.

(21) Appl. No.: 12/045,352

(22) Filed: Mar. 10, 2008

(65) Prior Publication Data

US 2008/0239890 A1  Oct. 2, 2008

(30) Foreign Application Priority Data

Mar. 27, 2007  (JP) ............................. 2007-081794

(51) Int. Cl.
*G11B 7/00* (2006.01)
(52) U.S. Cl. ............. 369/44.32; 369/44.41; 369/112.23
(58) Field of Classification Search ............. 369/44.32, 369/44.34, 44.41, 53.12, 53.13, 53.14, 53.15, 369/44.11, 44.42, 112.23, 44.27, 44.28
See application file for complete search history.

(56) References Cited

U.S. PATENT DOCUMENTS

| 7,394,734 B2 * | 7/2008 | Ishimoto ................... 369/44.35 |
| 7,613,082 B2 * | 11/2009 | Ishimoto et al. .......... 369/44.32 |
| 2007/0091743 A1 * | 4/2007 | Lee et al. ................. 369/44.32 |
| 2007/0242583 A1 * | 10/2007 | Huang et al. ............. 369/53.41 |

OTHER PUBLICATIONS

F. Zijp, et al., "Near Field Read-Out of a 50-GB First-Surface Disk with NA=1.9 and a Proposal for a Cover-Layer Incident, Dual-Layer Near Field System," Optical Data Storage 2004, Proceedings of SPIE vol. 5380 (SPIE, Bellingham, WA, 2004).

(Continued)

*Primary Examiner*—Nabil Z Hindi
(74) *Attorney, Agent, or Firm*—Fitzpatrick, Cella, Harper & Scinto

(57) ABSTRACT

An optical information recording and reproducing apparatus includes a light source for emitting a light beam, a head unit, including an objective lens and a solid immersion lens, that allows a light beam from the light source to reach an optical recording medium as evanescent light, and a photodetector that detects returning light that returns from a bottom surface of the solid immersion lens for detecting a gap and a tilt between the optical recording medium and the solid immersion lens. The photodetector has a first section and a second section, along a direction in which the returning light is moved in the photodetector, when the solid immersion lens is driven in a tracking direction with respect to the optical recording medium. An area of the returning light in the first section and an area of the returning light in the second section is constant, even when the solid immersion lens is driven in the tracking direction. The photodetector is divided into two halves in the direction in which the returning light is moved when the solid immersion lens is driven in the tracking direction, and has divided sections that are parallel to the direction in which the returning light is moved. The divided sections are disposed inside the inner circumference of the returning light in a direction perpendicular to the direction in which the returning light is moved. The apparatus further includes a tilt control circuit to control the tilt on the basis of a light intensity obtained by the photodetector.

3 Claims, 6 Drawing Sheets

OTHER PUBLICATIONS

C. Verschuren, et al., "Near Field Recording on First-Surface Write-Once Media with a NA=1.9 Solid Immersion Lens," Japanese Journal of Applied Physics, vol. 44, No. 5B, 2005, pp. 3564-3567.

C. Verschuren, et al., "Cover-Layer Incident Near-Field Recording: Towards 4-Layer Discs using Dynamic Tilt Control," Optical Data Storage, 2006, pp. 62820M1-62820M10.

* cited by examiner

OPTICAL INFORMATION RECORDING AND REPRODUCING APPARATUS

BACKGROUND OF THE INVENTION

1. Field of the Invention

The present invention relates to optical information recording and reproducing apparatuses, such as optical disc drive apparatuses, and more particularly, to a technique for detecting a tilt signal representing a tilt of a head unit, including a solid immersion lens (hereinafter abbreviated as SIL) and an objective lens.

2. Description of the Related Art

To increase a recording density of an optical disc, it is necessary to reduce a beam spot diameter on a recording surface of the optical disc. The beam spot diameter can be reduced by reducing a wavelength of light used for recording and reproducing information, and by increasing a numerical aperture (NA) of an objective lens. An objective lens having a lens element called an SIL, which is brought extremely close to the recording surface with a distance therebetween set to a fraction (for example, ½) of the recording wavelength, has been developed, to achieve an NA of one or more, even in air. Examples of such a structure are described in, for example, Japanese Journal of Applied Physics, vol. 44 (2005), pages 3564-3567, "Near Field Recording on First-Surface Write-Once Media with an NA=1.9 solid immersion lens" (hereinafter called Document 1), and in Optical Data Storage 2004, Proceedings of SPIE vol. 5380 (2004) "Near-field read-out of a 50-GB first-surface disk with NA=1.9 and a proposal for a cover-layer-incident, dual-layer near-field system" (hereinafter called Document 2).

The structure of an optical pickup included in an optical information recording and reproducing apparatus for near-field recording described in Document 1 (Japanese Journal of Applied Physics, vol. 44 (2005), pages 3564-3567) will be described with reference to FIG. 8. A light beam having a wavelength of 405 nm is emitted from a semiconductor laser 1, is collimated by a collimator lens 2, and is incident on beam shaping prisms 3, where an isotropic light-intensity distribution is obtained. Then, the light beam passes through a non-polarizing beam splitter (NBS) 4, a polarizing beam splitter (PBS) 7, and a quarter-wave plate (QWP) 8, which changes the polarization of the light beam from linear to circular. The light beam reflected by the non-polarizing beam splitter (NBS) 4 is received by a photodetector (LPC-PD) 6, which is used for controlling the emission power of the semiconductor laser 1. The light beam that passes through the quarter-wave plate (QWP) 8 is incident on an expander lens 9. The expander lens 9 corrects spherical aberrations generated by an objective lens 10 and an SIL 11, which will be described below, and includes two lenses spaced from each other by a distance that can be controlled in accordance with the spherical aberrations. The light beam from the expander lens 9 is incident on the objective lens 10 in a head unit 50. The head unit 50 includes the objective lens 10 and the SIL 11, which are mounted on actuators (not shown) that drive the two lenses together in a focusing direction, a tracking direction, and a tilt direction.

Only when the distance between the bottom surface of the SIL 11 and the surface of an optical disc 12 is a fraction of the wavelength of the light source (405 nm), for example, 100 nm or less, evanescent light that emanates from the bottom surface of the SIL 11 affects the recording surface so that information can be recorded or reproduced with a beam spot diameter corresponding to an effective numerical aperture NAeff. The above-mentioned distance is maintained by a gap servo system, which will be described below.

Referring to FIG. 8 again, a returning path of the light beam in the optical system will be described. When the light beam is reflected by the optical disc 12, the direction of circular polarization of the light beam is reversed. The reflected light beam is incident on the SIL 11 and the objective lens 10, where the light beam is collimated again. Then, the light beam passes through the expander lens 9 and the quarter-wave plate (QWP) 8, which changes the polarization of the light beam to linear, such that the direction of linear polarization is perpendicular to that of the light beam that travels toward the optical disc 12. Then, the light beam is reflected by the polarizing beam splitter (PBS) 7 and passes through a half-wave plate (HWP) 13, which rotates the plane of polarization of the light beam by 45°. An s-polarized component of the light emitted from the half-wave plate (HWP) 13 is reflected by a polarizing beam splitter (PBS) 14, passes through a lens 15, and is collected on a first photodetector (PD1) 16, so that information recorded on the optical disc 12 is reproduced as an RF output 17. A p-polarized component of the light emitted from the half-wave plate (HWP) 13 passes through the polarizing beam splitter (PBS) 14, is reflected by a mirror 18, passes through a lens 19, and is collected on a second two-division photodetector (PD2) 20. Accordingly, a tracking error 21 is output.

A portion of the light beam that corresponds to NAeff<1 and that does not cause total reflection at the bottom surface of the SIL 11 is reflected, such that the direction of circular polarization of the light beam is reversed, similar to the light reflected by the optical disc 12. A portion of the light beam that corresponds to NAeff≧1 and causes total reflection at the bottom surface of the SIL 11 is reflected, such that a phase difference δ is generated between the p-polarized component and the s-polarized component, and the polarization is changed from circular to elliptical. The phase difference δ is expressed as follows:

$$\tan(\delta/2) = \cos\theta i \times \sqrt{(N2 \times \sin 2\theta i - 1)}/(N \times \sin 2\theta i) \qquad (1)$$

Therefore, after the light beam passes through the quarter-wave plate (QWP) 8, the light beam includes a component polarized in the same direction as that of the light beam that travels toward the optical disc 12. This component passes through the PBS 7, is reflected by the NBS 4, passes through a lens 26, and is collected on a third photodetector (PD3) 27. The light intensity of this component is gradually reduced as the distance between the bottom surface of the SIL 11 and the optical disc 12 is reduced in the near field range, and therefore, can be used as a gap error 28. Accordingly, gap servo control can be performed by setting a target threshold in advance, and causing a gap servo circuit (not shown) to operate, such that the distance between the bottom surface of the SIL 11 and the surface of the optical disc 12 is maintained at a desired distance of 100 nm or less.

The gap servo control is described in detail in the above-mentioned Document 1 (Japanese Journal of Applied Physics, vol. 44 (2005), pages 3564-3567).

The light beam used for the gap servo circuit is not modified by the information recorded on the optical disc 12. Therefore, the gap error 28 can be reliably obtained irrespective of the presence/absence of recorded information.

FIG. 6 shows the third photodetector (PD3) 27. The third photodetector (PD3) 27 is a two-division photodetector having two sections A and B. As described above, the light intensity of the light beam that corresponds to NAeff≧1 and causes total reflection is gradually reduced as the distance between the bottom surface of the SIL 11 and the optical disc 12 is reduced in the near field range. Therefore, a tilt signal representing a relative tilt between the bottom surface of the SIL 11 and the surface of the optical disc 12 can be obtained by detecting a difference signal representing a difference in light intensity of the light returning from the bottom surface of the SIL 11 and the surface of the optical disc 12 between sections A and B. The tilt signal is input to a tilt control circuit 30 (shown in FIG. 8), which performs tilt servo control by outputting a signal to a voice coil motor (not shown) in an actuator mounted on the head unit 50, so as to prevent the bottom surface of the SIL 11 and the surface of the optical disc 12 from coming into contact with each other.

The tilt servo control is described in detail in Optical Data Storage 2006, "Cover-Layer Incident Near-Field Recording: Towards 4-Layer Discs using Dynamic Tilt Control" (hereinafter called Document 3).

As described above, the objective lens 10 and the SIL 11 are adjusted by the voice coil motor (not shown) of the actuator mounted on the head unit 50. The head unit 50 drives the actuator (not shown), such that the distance between the SIL 11 and the optical disc 12 is maintained at a predetermined distance using the gap error 28, based on a sum signal from the third two-division photodetector (PD3) 27. In addition, the tilt control circuit 30 outputs a signal for correcting the relative tilt between the bottom surface of the SIL 11 and the surface of the optical disc 12 using a tilt error 31 based on a difference signal from the third two-division photodetector (PD3) 27.

However, the optical pickup used in the known optical information recording and reproducing apparatus for near-field recording has the following problems. That is, in the known apparatus, the gap error 28 obtained by the third two-division photodetector (PD3) 27 is used to maintain the distance between the SIL 11 and the optical disc 12 at a predetermined distance, and the tilt error 31 is used to correct the relative tilt between the bottom surface of the SIL 11 and the surface of the optical disc 12. However, as shown in FIG. 7, in the process of detecting the tilt error 31 based on a difference signal between the divided sections A and B of the third photodetector (PD3) 27, there is a possibility that the head unit 50 will move in the radial direction of the optical disc 12 (X direction in FIG. 7) due to eccentricity of the optical disc 12, or the like. In such a case, the beam spot on the third photodetector (PD3) 27 also moves at the same time. Therefore, an offset is included in the tilt error 31 obtained by the third photodetector (PD3) 27, and it is difficult to accurately detect the tilt.

As described above, the distance between the end face of the SIL 11 and the surface of the optical disc 12 is 100 nm or less, and, therefore, the relative tilt between them must be controlled with high accuracy. If there is an additional error factor, such as the influence of movement of the head unit 50, as described above, the accuracy of the tilt servo control is degraded.

SUMMARY OF THE INVENTION

The present invention is directed to a structure that is capable of detecting a tilt of a head unit, including an SIL (i.e., a solid immersion lens) and an objective lens, with respect to an optical disc, while suppressing variation in a tilt error signal caused by displacement of the head unit.

According to an embodiment of the present invention, an optical information recording and reproducing apparatus includes a light source, a head unit including an objective lens and a solid immersion lens for allowing a light beam from the light source to reach an optical recording medium as evanescent light, a photodetector configured to detect returning light that returns from a bottom surface of the solid immersion lens for detecting a gap and a tilt between the optical recording medium and the solid immersion lens, the photodetector having a first section and a second section, along a direction in which the returning light is moved in the photodetector when the solid immersion lens is driven in a tracking direction with respect to the optical recording medium, an area of the returning light in the first section and an area of the returning light in the second section being constant, even when the solid immersion lens is driven in the tracking direction, and a tilt control circuit configured to control the tilt on the basis of a light intensity obtained by the photodetector.

Further features of the present invention will become apparent from the following description of exemplary embodiments with reference to the attached drawings.

DESCRIPTION OF THE EMBODIMENTS

Embodiments of the present invention will be described below with reference to the accompanying drawings.

First Embodiment

Figure 8:
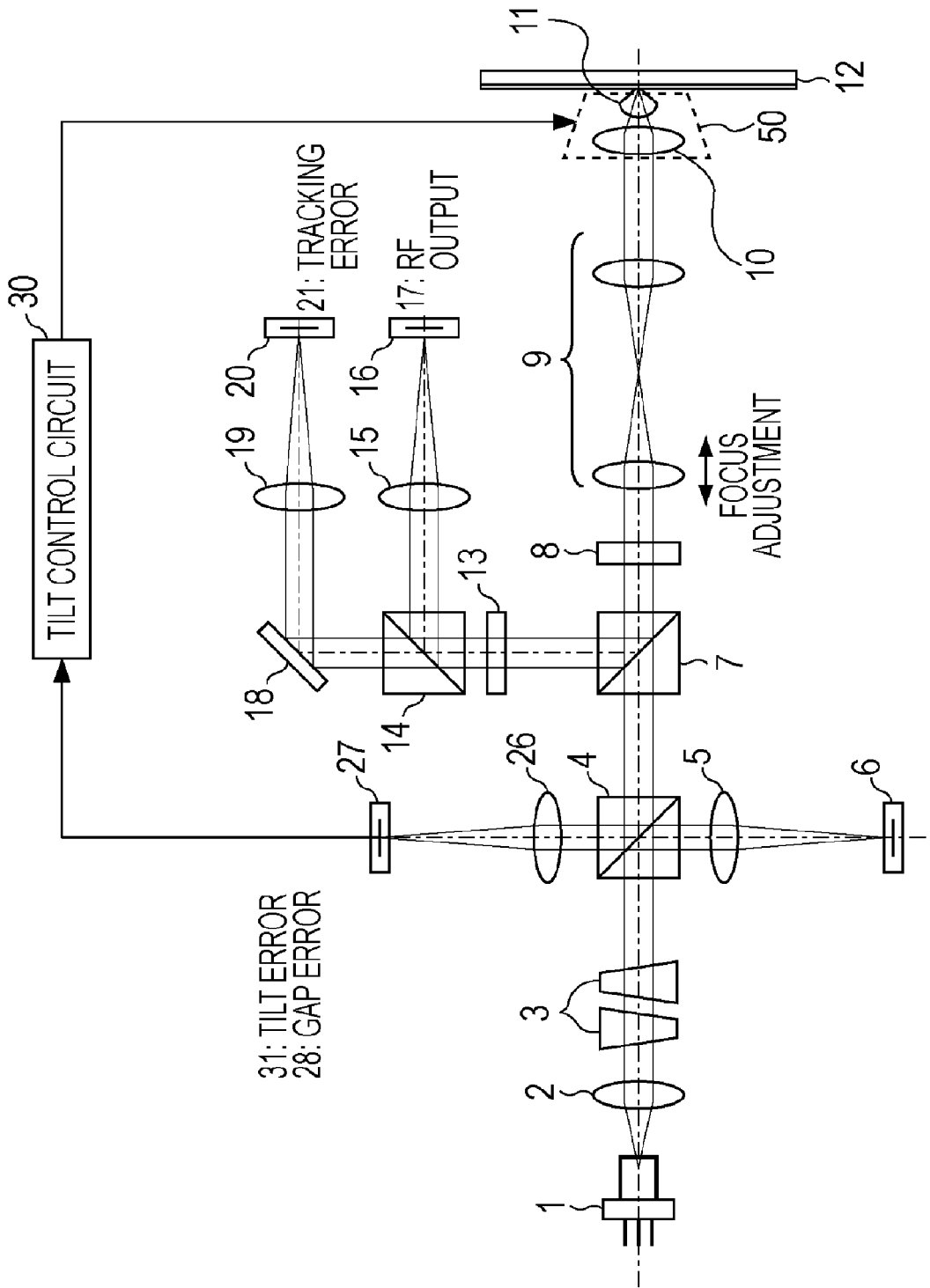
FIG. 8 illustrates the known optical information recording and reproducing apparatus for near-field recording.
Figure 9:
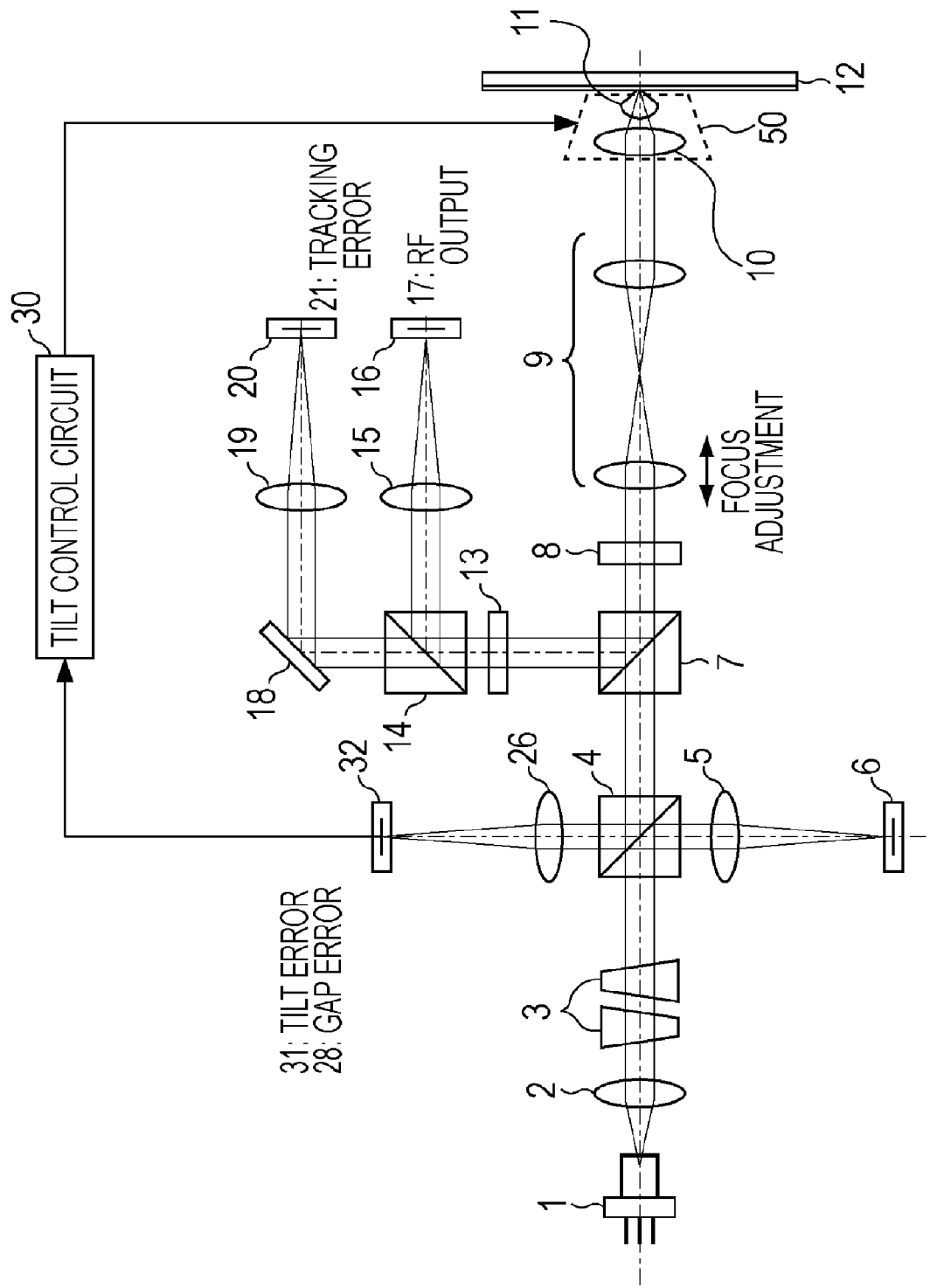
FIG. 9 illustrates the optical information recording and reproducing apparatus for near-field recording according to the first embodiment.

A first embodiment of the present invention will be described below with reference to FIGS. 1, 2, and 9. FIG. 9 shows an optical information recording and reproducing apparatus and an optical recording medium according to the first embodiment of the present invention. In particular, FIG. 9 illustrates the structure of an optical pickup for near-field recording. The structure shown in FIG. 9 is similar to that shown in FIG. 8, except for a fourth multi-division photodetector (PD4) 32.

Figure 1:
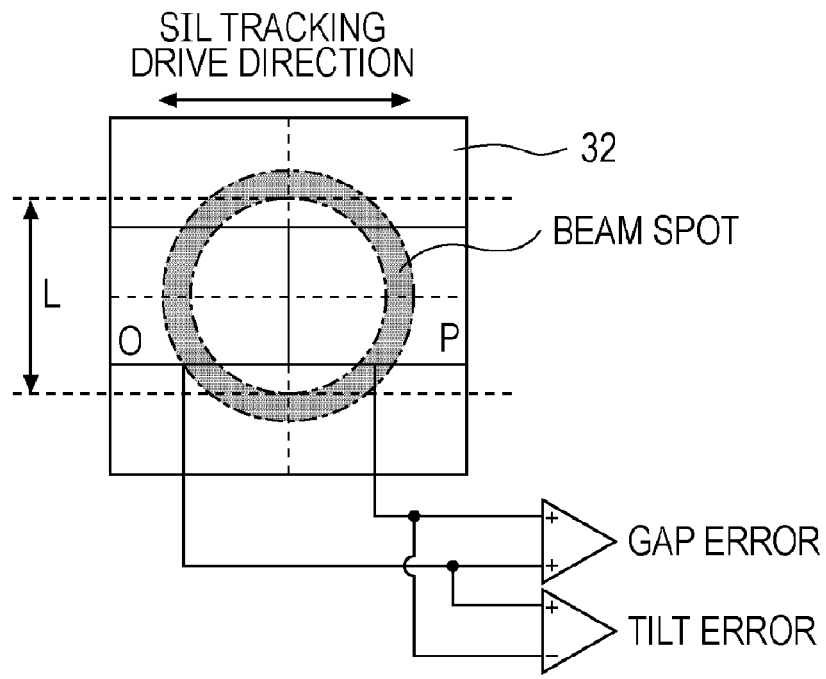
FIG. 1 illustrates a (fourth) multi-division photodetector included in an optical information recording and reproducing apparatus for near-field recording according to a first embodiment according to the present invention.

FIG. 1 shows a light reception pattern on the fourth multi-division photodetector (PD4) 32 included in the optical pickup for near-field recording, which characterizes the present invention.

As shown in FIG. 9, a light beam having a wavelength of 405 nm is emitted from a semiconductor laser 1, is collimated by a collimator lens 2, and is incident on beam shaping prisms 3, where an isotropic light-intensity distribution is obtained. Then, the light beam passes through a non-polarizing beam splitter (NBS) 4, a polarizing beam splitter (PBS) 7, and a quarter-wave plate (QWP) 8, which changes the polarization of the light beam from linear to circular. The light beam reflected by the non-polarizing beam splitter (NBS) 4 is received by a photodetector (LPC-PD) 6, which is used for controlling the emission power of the semiconductor laser 1. The light beam that passes through the quarter-wave plate (QWP) 8 is incident on an expander lens 9. The expander lens 9 corrects spherical aberrations generated by an objective lens 10 and a solid immersion lens (SIL) 11, which will be described below, and includes two lenses spaced from each other by a distance that can be controlled in accordance with the spherical aberrations. The light beam from the expander lens 9 is incident on the objective lens 10 in a head unit 50. The head unit 50 includes the objective lens 10 and the SIL 11, which are mounted on actuators (not shown) that drive the two lenses together in a focusing direction, a tracking direction, and a tilt direction. The objective lens 10 has an NA of 0.7 and the SIL 11 is a hemispherical lens having an NA of 2. The effective numerical aperture NAeff of the combination of the objective lens 10 and the SIL 11 is 1.4.

If the distance between the bottom surface of the SIL 11 and an optical disc 12 is a fraction of the wavelength of the light source (405 nm), for example, 100 nm or less, evanescent light that emanates from the bottom surface of the SIL 11 reaches the recording surface of the optical disc 12. Therefore, information can be recorded or reproduced by a light beam focused on the recording surface and having a beam spot diameter corresponding to the effective numerical aperture NAeff. The above-mentioned distance is maintained using the gap servo system.

When the light beam is reflected by the optical disc 12, the direction of circular polarization of the light beam is reversed. The reflected light beam is incident on the SIL 11 and the objective lens 10, where the light beam is collimated again. Then, the light beam passes through the expander lens 9 and the quarter-wave plate (QWP) 8, which changes the polarization of the light beam to linear, such that the direction of linear polarization is perpendicular to that of the light beam that travels toward the optical disc 12. Then, the light beam is reflected by the polarizing beam splitter (PBS) 7 and passes through a half-wave plate (HWP) 13, which rotates the plane of polarization of the light beam by 45°. An s-polarized component of the light emitted from the half-wave plate (HWP) 13 is reflected by a polarizing beam splitter (PBS) 14, passes through a lens 15, and is collected on a first photodetector (PD1) 16, so that information recorded on the optical disc 12 is reproduced as an RF output 17. A p-polarized component of the light emitted from the half-wave plate (HWP) 13 passes through the polarizing beam splitter (PBS) 14, is reflected by a mirror 18, passes through a lens 19, and is collected on a second two-division photodetector (PD2) 20.

A portion of the light beam that corresponds to NAeff<1 and that does not cause total reflection at the bottom surface of the SIL 11 is reflected, such that the direction of circular polarization of the light beam is reversed, similar to the light reflected by the optical disc 12. A portion of the light beam that corresponds to NAeff≧1 and causes total reflection at the bottom surface of the SIL 11 is reflected such that a phase difference δ shown in Expression (1), discussed above, is generated between the p-polarized component and the s-polarized component, and the polarization is changed from circular to elliptical. Therefore, after the light beam passes through the quarter-wave plate (QWP) 8, the light beam includes a component polarized in the same direction as that of the light beam that travels toward the optical disc 12. This component passes through the PBS 7, is reflected by the NBS 4, passes through a lens 26, and is detected by a fourth multi-division photodetector (PD4) 32.

Light-receiving sections of the fourth multi-division photodetector (PD4) 32, according to the first embodiment, will be described with reference to FIG. 1. The fourth multi-division photodetector (PD4) 32, on which the light beam that passes through the lens 26 is incident, is divided into two sections in a direction parallel to a tracking drive direction of the SIL 11. More specifically, the fourth multi-division photodetector (PD4) 32 has two sections O and P along a direction corresponding to the tracking drive direction, in which returning light that returns from the bottom surface of the SIL 11 is moved on the fourth photodetector (PD4). The two sections O and P are positioned within a range (denoted by L in FIG. 1) smaller than the inner diameter of the returning light.

The light intensity of the component incident on the fourth multi-division photodetector (PD4) 32 is gradually reduced as the distance between the bottom surface of the SIL 11 and the surface of the optical disc 12 is reduced in the near field range. Therefore, a sum signal of the sections O and P of the fourth photodetector (PD4) 32 divided in the manner shown in FIG. 1 can be used as a gap error 28. Accordingly, gap servo control can be performed by setting a target threshold in advance and driving an actuator (not shown), such that the distance between the bottom surface of the SIL 11 and the optical disc 12 is maintained at a desired distance of 100 nm or less. In addition, the gap error 28 can be normalized using an output from a photodetector (LPC-PD) 6, which is used for controlling the emission power of the semiconductor laser 1.

If the head unit 50 moves in the radial direction due to eccentricity of the disc, or the like, the beam spot on the fourth multi-division photodetector (PD4) 32 also moves.

Figure 2:
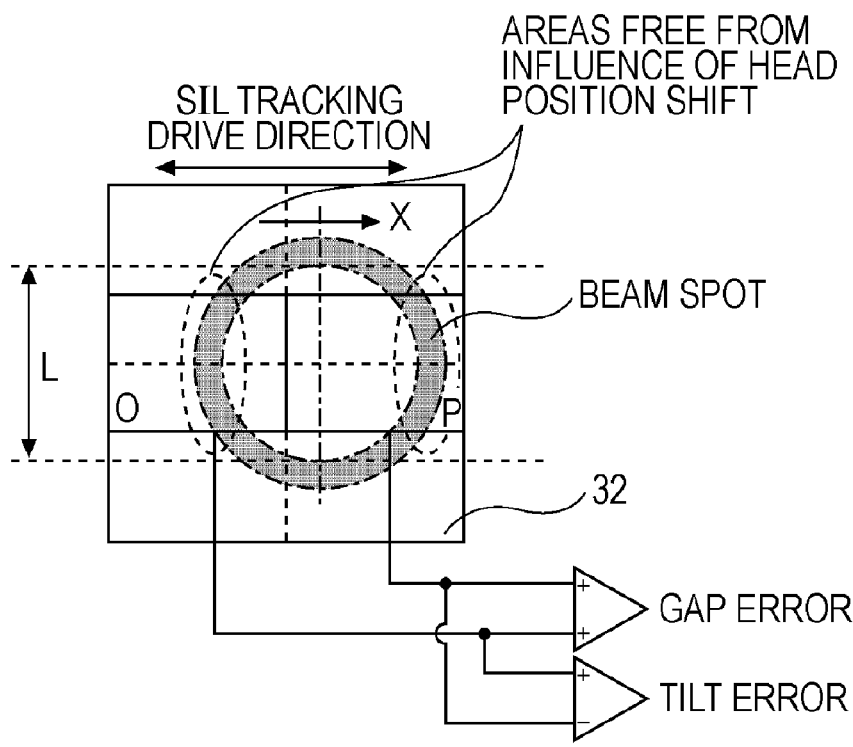
FIG. 2 illustrates a beam shape on the fourth multi-division photodetector according to the first embodiment, when a head unit is shifted with respect to an optical disc.

Referring to FIG. 2, in the divided sections O and P of the fourth multi-division photodetector (PD4) 32, according to the first embodiment, the light beam is received in areas (elliptical areas surrounded by the dashed lines) where the light intensity of the received light is not influenced by a shift of the beam spot caused when the head unit 50 is shifted in the direction shown by the arrow X. Therefore, the tilt between the end surface of the SIL 11 and the surface of the optical disc 12 can be accurately determined. The fourth photodetector (PD4) 32 has a first section and a second section along a direction in which the returning light that returns from the bottom surface of the SIL 11 is moved on the fourth photodetector (PD4) 32, when the SIL 11 is driven along the optical recording medium in the tracking direction. Accordingly, even when the SIL 11 is driven in the tracking direction, the area of the returning light from the SIL 11 is substantially constant in the first section (divided section O) and the second section (divided section P). Therefore, the tilt of the head unit 50, including the SIL 11 and the objective lens 10 with respect to the optical disc 12, can be detected, while variation in the tilt error signal caused by the positional shift of the head unit 50 is suppressed. The state in which the area is substantially constant includes the state in which the area is not precisely constant, that is, the state in which errors are included.

As a result, the tilt between the bottom surface of the SIL 11 and the surface of the optical disc 12 can be accurately controlled.

In the present embodiment, the objective lens 10 and the SIL 11 included in the head unit 50 are driven together. However, the objective lens 10 and the SIL 11 can also be driven and controlled individually. This also applies to the second embodiment described below.

Second Embodiment

A second embodiment of the present invention will be described with reference to FIGS. 3 to 5. FIG. 5 illustrates an optical information recording and reproducing apparatus according to the second embodiment.

Explanations of the structures shown in FIG. 5 that are similar to those of the first embodiment will be omitted. The second embodiment differs from the first embodiment in that a fifth multi-division photodetector (PD5) 33 is provided, and tracking control is performed on the basis of signals obtained from the fifth photodetector (PD5) 33. The fifth photodetector (PD5) 33 will be described below.

Figure 3:
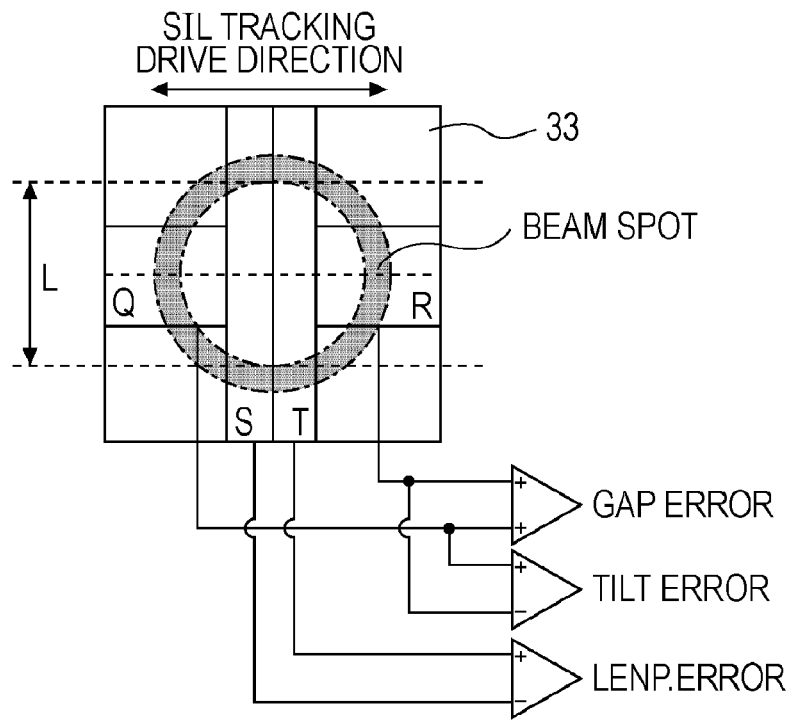
FIG. 3 illustrates a fifth multi-division photodetector included in an optical information recording and reproducing apparatus for near-field recording according to a second embodiment.

FIG. 3 shows the fifth multi-division photodetector (PD5) 33 according to the second embodiment.

In the second embodiment, the light beam that passes through the lens 26 is incident on the fifth multi-division photodetector (PD5) 33. As shown in FIG. 3, the fifth multi-division photodetector (PD5) 33 is divided into sections Q and R in a direction parallel to the tracking drive direction of the SIL 11. The sections Q and R are positioned within a range (denoted by L in FIG. 3) smaller than the inner diameter of the returning light. In addition, the central area of the fifth multi-division photodetector (PD5) 33 is divided into sections S and T, which extend in a direction perpendicular to the tracking drive direction of the head unit 50.

The light intensity of the component incident on the fifth multi-division photodetector (PD5) 33 is gradually reduced as the distance between the bottom surface of the SIL 11 and the surface of the optical disc 12 is reduced in the near field range. Therefore, a sum signal of the sections Q and R of the fifth multi-division photodetector (PD5) 33, divided in the manner shown in FIG. 3, can be used as a gap error 28. Accordingly, gap servo control can be performed by setting a target threshold in advance, and driving an actuator, such that the distance between the bottom surface of the SIL 11 and the optical disc 12 is maintained at a desired distance of 100 nm or less. In addition, the gap error 28 can be normalized using an output from a photodetector (LPC-PD) 6, which is used for controlling the emission power of the semiconductor laser 1.

Figure 4:
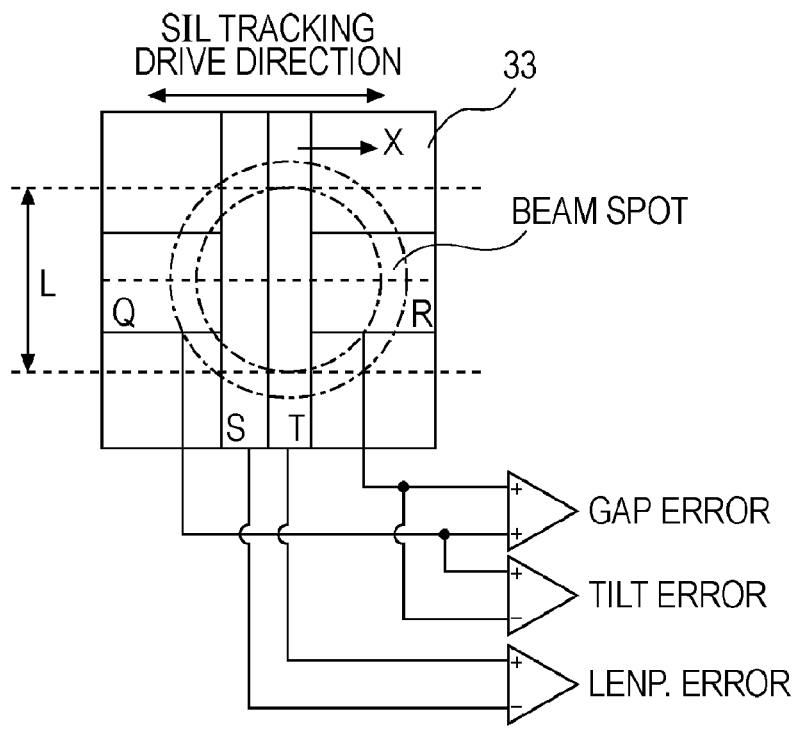
FIG. 4 illustrates a beam shape on the fifth multi-division photodetector according to the second embodiment, when a head unit is shifted with respect to an optical disc.
Figure 5:
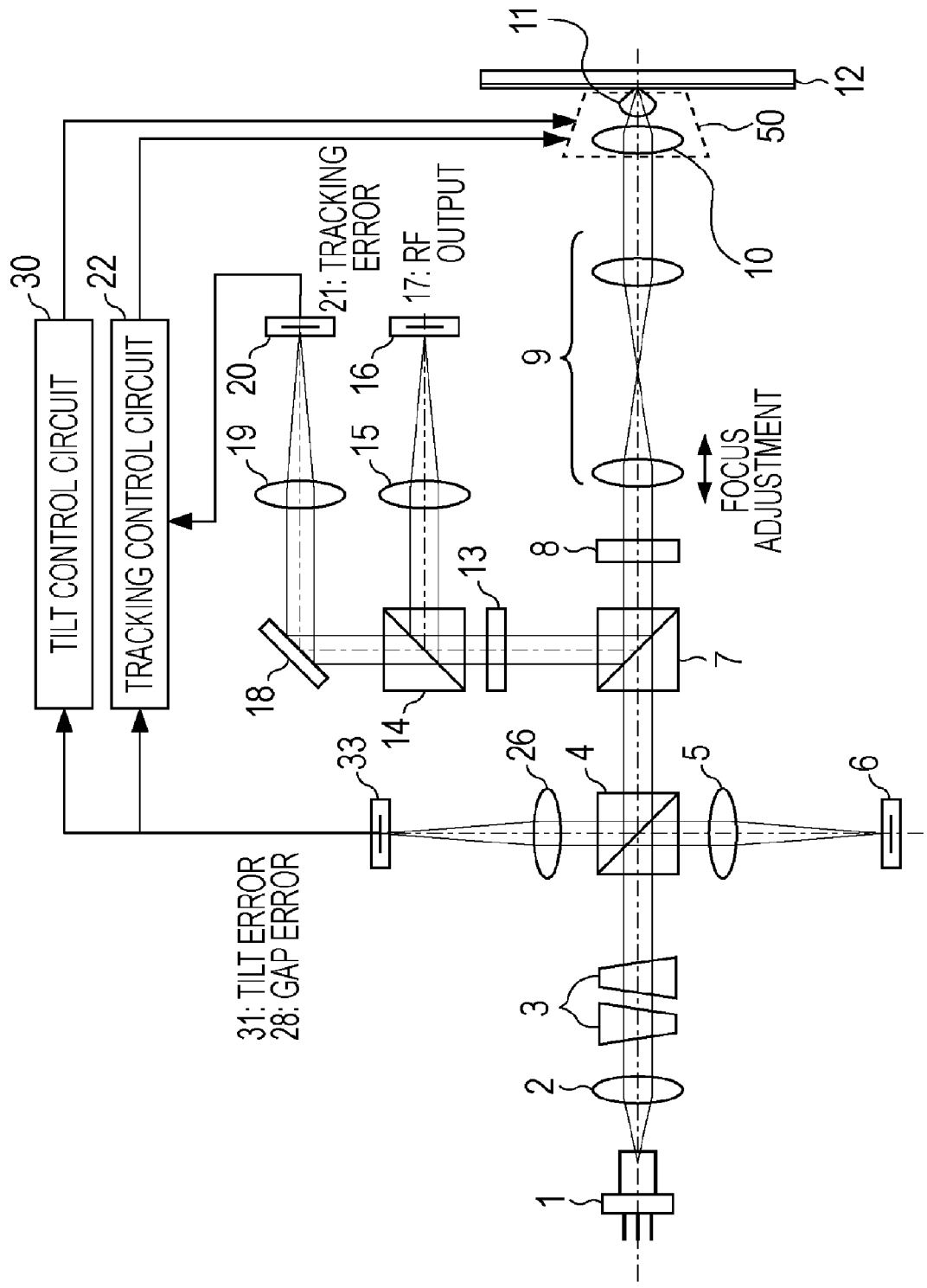
FIG. 5 illustrates the optical information recording and reproducing apparatus for near-field recording according to the second embodiment.
Figure 6:
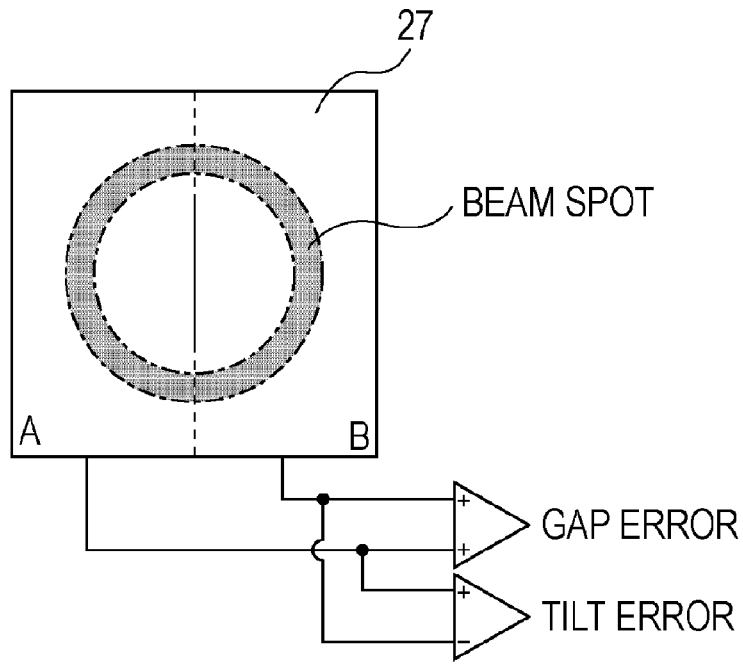
FIG. 6 illustrates a third photodetector included in a known optical information recording and reproducing apparatus for near-field recording.
Figure 7:
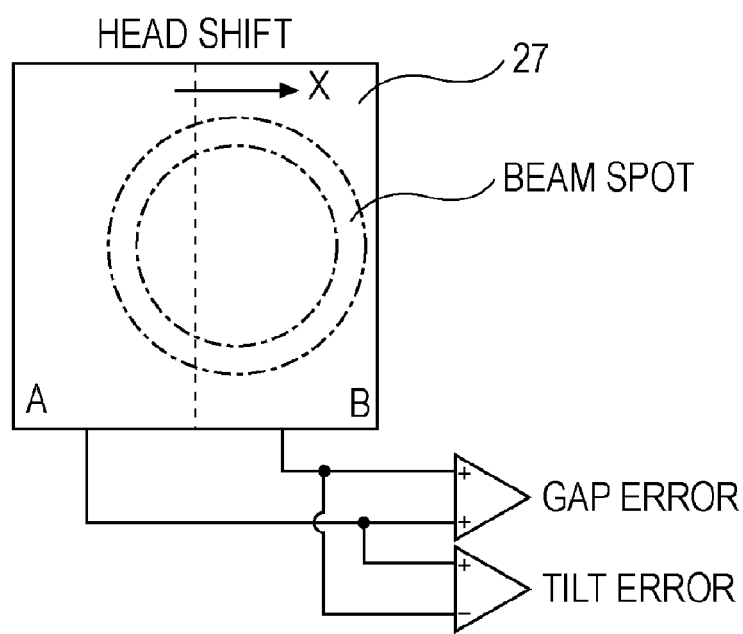
FIG. 7 illustrates a beam shape on a third photodetector included in the known optical information recording and reproducing apparatus for near-field recording when a head unit is shifted with respect to an optical disc.

Referring to FIG. 4, in the divided sections Q and R, the light beam is received in areas where the light intensity of the received light is not influenced by a shift of the beam spot caused when the head unit 50 is shifted in the direction shown by the arrow X. Therefore, compared to the known structure, tilt control can be performed with a higher accuracy.

If the head unit 50 moves in the radial direction due to eccentricity of the disc, or the like, the beam spot on the second two-division photodetector (PD2) 20 also moves. Therefore, an offset is included in the tracking error 21. Here, a case is considered in which the beam spot on the fifth multi-division photodetector (PD5) 33 is shifted in the direction shown by the arrow X due to a shift of the head unit 50. In this case, a position signal (or a lens position error signal LenP.error) representing the position of the optical head unit 50 with respect to the optical axis can be determined by the following Equation (2) for obtaining a difference signal between the divided sections S and T of the fifth photodetector.

$$(S-T)/(S+T)=\text{LenP.error} \qquad (2)$$

The fifth photodetector (PD5) 33 has a third section (section S) and a fourth section (section T), along a direction in which the returning light, which returns from the bottom surface of the SIL 11, is moved on the fifth photodetector (PD5) 33, when the SIL 11 is driven along the optical disc 12 in the tracking direction. The third section (section S) and the fourth section (section T) are divided from each other by the centerline of the fifth photodetector (PD5) 33.

In the sections S and T, the area of the returning light varies when the SIL 11 is driven in the tracking direction. Therefore, the position signal representing the position of the optical head unit 50 with respect to the optical axis can be detected using the above Equation (2).

The tracking control circuit 22 corrects the tracking error 21 on the basis of the position signal representing the position of the head unit 50, so that a tracking error signal free from offset of the head unit position can be obtained.

Therefore, in addition to the tilt control, tracking servo control can also be performed with a high accuracy by detecting the position signal representing the position of the head unit 50. In addition, the actuator can be prevented from being largely displaced from a neutral position during track jumps by controlling the actuator on the basis of the position signal of the head unit 50. Accordingly, access to a desired track is facilitated.

As described above, according to the embodiments of the present invention, a tilt of a head unit, including an SIL and an objective lens, with respect to an optical disc, can be detected while variation in a tilt error signal caused by a positional shift of the head unit is suppressed. As a result, the tilt between the end surface of the SIL and the surface of the optical disc can be controlled with a higher accuracy than that in the known structure.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

Except as otherwise discussed herein, the various components shown in outline or in block form in the Figures are individually well known and their internal construction and operation are not critical either to the making or using, or to a description of the best mode of the invention.

This application claims the benefit of Japanese Application No. 2007-081794 filed Mar. 27, 2007, which is hereby incorporated by reference herein in its entirety.

What is claimed is:

1. An optical information recording and reproducing apparatus comprising:
   a light source for emitting a light beam;
   a head unit, including an objective lens and a solid immersion lens, for allowing a light beam from the light source to reach an optical recording medium as evanescent light;
   a photodetector configured to detect returning light that returns from a bottom surface of the solid immersion lens for detecting a gap and a tilt between the optical recording medium and the solid immersion lens, the photodetector having a first section and a second section, along a direction in which the returning light is moved in the photodetector, when the solid immersion lens is driven in a tracking direction with respect to the optical recording medium, an area of the returning light in the first section and an area of the returning light in the second section is constant, even when the solid immersion lens is driven in the tracking direction, wherein the photodetector is divided into two halves in the direction in which the returning light is moved when the solid immersion lens is driven in the tracking direction, and has divided sections that are parallel to the direction in which the returning light is moved, the divided sections being disposed inside the inner circumference of the returning light in a direction perpendicular to the direction in which the returning light is moved; and a tilt control circuit configured to control the tilt on the basis of a light intensity obtained by the photodetector.

2. An optical information recording and reproducing apparatus comprising:

a light source for emitting a light beam;

a head unit, including an objective lens and a solid immersion lens, for allowing a light beam from the light source to reach an optical recording medium as evanescent light;

a photodetector configured to detect returning light that returns from a bottom surface of the solid immersion lens for detecting a gap and a tilt between the optical recording medium and the solid immersion lens, the photodetector having a first section and a second section, along a direction in which the returning light is moved in the photodetector, when the solid immersion lens is driven in a tracking direction with respect to the optical recording medium, an area of the returning light in the first section and an area of the returning light in the second section is constant, even when the solid immersion lens is driven in the tracking direction, wherein the photodetector further has a third section and a fourth section, along the direction in which the returning light is moved in the photodetector when the solid immersion lens is driven in the tracking direction with respect to the optical recording medium, and wherein an area of the returning light in the third section and an area of the returning light in the fourth area vary when the solid immersion lens is driven in the tracking direction; and a tilt control circuit configured to control the tilt on the basis of a light intensity obtained by the photodetector.

3. The apparatus according to claim 2, wherein the third area and the fourth area are disposed inside the inner circumference of the returning light in the direction in which the returning light is moved, and are disposed next to each other with a centerline of the photodetector therebetween, the centerline extending perpendicular to the direction in which the returning light is moved in the photodetector, whereby positions of the objective lens and the solid immersion lens with respect to the optical axis are detectable.

* * * * *